(12) United States Patent
Gualtieri et al.

(10) Patent No.: US 11,452,021 B2
(45) Date of Patent: Sep. 20, 2022

(54) METHOD AND SYSTEM FOR PROVIDING TRANSPARENT COMMUNICATION

(71) Applicant: Rohde & Schwarz GmbH & Co. KG, Munich (DE)

(72) Inventors: Francesco Gualtieri, Munich (DE); Bernhard Ganslmeier, Rosenheim (DE); Wolfgang Muehlbauer, Grosskarolinenfeld (DE)

(73) Assignee: ROHDE & SCHWARZ GMBH & CO., Munich (DE)

( * ) Notice: Subject to any disclaimer, the term of this patent is extended or adjusted under 35 U.S.C. 154(b) by 147 days.

(21) Appl. No.: 16/591,934

(22) Filed: Oct. 3, 2019

(65) Prior Publication Data

US 2020/0120573 A1    Apr. 16, 2020

(30) Foreign Application Priority Data

Oct. 16, 2018 (EP) ..................................... 18200740

(51) Int. Cl.
*H04W 36/38* (2009.01)
*H04L 67/145* (2022.01)
*H04W 36/08* (2009.01)

(52) U.S. Cl.
CPC ........... *H04W 36/38* (2013.01); *H04L 67/145* (2013.01); *H04W 36/08* (2013.01)

(58) Field of Classification Search
None
See application file for complete search history.

(56) References Cited

U.S. PATENT DOCUMENTS 5,959,972 A     9/1999  Hamami
6,522,867 B1 *  2/2003  Wright ................. G08G 5/0021
                                                    455/66.1

(Continued)

FOREIGN PATENT DOCUMENTS

EP        3240356 A1   11/2017
EP        3211838 B1    8/2018
WO     2008/086419 A2   7/2008

OTHER PUBLICATIONS

Extended European search report for European Patent Application No. 18200740.1, dated Apr. 24, 2019, 10 pages.

(Continued)

*Primary Examiner* — Chi H Pham
*Assistant Examiner* — Raul Rivas
(74) *Attorney, Agent, or Firm* — Westman, Champlin & Koehler, P.A.

(57) ABSTRACT

A communication system comprising at least one radio station which includes a main radio unit and at least one associated standby radio unit and comprising a user console connected via a communication network to the main radio unit of the radio station addressed by a network address of the communication network, wherein the main radio unit and its associated standby radio units are configured to be operated in parallel and to exchange operational parameters during operation of said communication system, wherein an operation failure of the main radio unit of a radio station triggers an automatic handover of the used network address from the main radio unit of the radio station to an associated standby radio unit of said radio station to maintain an uninterrupted communication between the user console and the respective radio station of said communication system.

13 Claims, 6 Drawing Sheets

(56) References Cited

U.S. PATENT DOCUMENTS

| | | | |
|---|---|---|---|
| 6,687,217 B1 | 2/2004 | Chow et al. | |
| 9,635,663 B2 | 4/2017 | Murphy et al. | |
| 10,405,185 B2 | 9/2019 | Müller | |
| 10,484,199 B2 | 11/2019 | Mueller | |
| 2006/0009262 A1* | 1/2006 | Hamm | H04B 7/18506 |
| 2006/0140019 A1 | 6/2006 | Lee | |
| 2008/0095085 A1* | 4/2008 | Goodjohn | H04W 24/04 |
| 2012/0115431 A1* | 5/2012 | Kim | H04W 76/50 |
| | | | 455/404.1 |
| 2016/0113006 A1 | 4/2016 | Murphy et al. | |
| 2019/0123933 A1 | 4/2019 | Mueller | |
| 2019/0159032 A1 | 5/2019 | Müller | |

OTHER PUBLICATIONS

Kabashkin, Igor, "Dynamic Reconfiguration of Architecture in the Communication Network of Air Traffic Management System", 2017 IEEE International Conference on Computer and Information Technology, IEEE Computer Society, 978-1-5386-0958-3/17 $31.00 © 2017 IEEE, DOI 10.1109/CIT.2017.13, 6 pages.

Hunt, R. et al., "Application of Digital Radio for Distribution Pilot Protection", Conference Papers, Paper No. 08 A3, 978-1-4244-2148-0/08/$25.00 © 2008 IEEE, 9 pages.

\* cited by examiner

METHOD AND SYSTEM FOR PROVIDING TRANSPARENT COMMUNICATION

CROSS REFERENCE TO RELATED APPLICATION

This application claims priority to European Patent Application No. 18200740.1, filed on Oct. 16, 2018, the content of which is hereby incorporated by reference.

FIELD OF THE INVENTION

The invention relates to a communication system and a method for providing transparent communication between a user console and a radio station via a communication network.

TECHNICAL BACKGROUND

Voice communication systems (VCSs) can be used for handling different kinds of traffic via radio links. For example, air traffic control systems (ATC) can comprise voice communication systems used for communication between an air traffic controller and a pilot. All flights based on instrument flight rules IFR require voice communication between the pilot and the air traffic controller. Voice communications can take place based on a radio network that ensures countrywide coverage during all phases of the flight independent of the altitude of the airplane. For this purpose, radio stations with radios and associated RF components are installed at suitable radio locations, for instance at airports or on mountain tops. Depending on the operation requirements, a number of different radio channels can be available for each location combined with a corresponding number of device installations. To ensure the availability of the radio system in case a component fails, additional devices can be installed to provide redundancy.

The radio systems as well as the air traffic controllers working at controller working consoles at controller working positions CWP can be connected to a terrestrial voice communication system VCS. A voice communication system VCS connects a controller working console dynamically or semi-permanently with an associated radio system so that the air traffic controller can work on a frequency assigned to his respective sector.

The connection of a radio system and a controller working position or the interconnection of individual voice switching nodes can be made using analog telephone lines or via digital transmission lines. Transmission lines for connecting radio locations can be leased from telecommunication providers. However, many telecommunication providers no longer offer analog landlines.

Accordingly, conventional traffic control systems use more and more Voice over IP for communication. Voice over IP systems no longer transmit voice over circuit switched voice networks but over an IP-based packet switched data network.

Voice over IP redundancy concepts are mostly realized in the voice communication system VCS. Redundancy is mostly achieved by providing more than one radio unit at each radio station or radio site. These radio units can comprise Voice over IP radio units or analog radio units. Each radio station of the system comprises a main hot radio unit as well as a backup or standby radio unit connected via a communication network to a user console of a user such as an air traffic controller. The main radio unit as well as the standby radio unit can provide a radio link RL to a mobile radio unit, for instance to a mobile radio unit integrated in a vehicle such as an airplane. If the main radio unit fails or provides a radio link of poor quality a switchover from the main radio unit to the standby radio unit has to take place. However, in a conventional communication system, switching from the main radio unit to the standby radio unit can cause an interruption in the communication between the user console and the mobile radio unit. The interruption of the communication between the mobile radio unit and the user console can have severe impacts on the safety of the managed traffic system. Even if the interruption of the voice communication between an air pilot and an air traffic controller is relatively short, this may lead to misunderstandings or suppression of relevant traffic information which may cause catastrophic air accidents.

SUMMARY OF THE INVENTION

Accordingly, there is a need to provide a method and a system for providing safe uninterrupted communication between a user console and a radio station via a communication network.

This present invention provides according to a first aspect of the present invention a communication system comprising the features of claim 1.

The invention provides according to the first aspect a communication system comprising: at least one radio station which includes a main radio unit and at least one associated standby radio unit and further comprising a user console connected via a communication network to the main radio unit of the radio station addressed by a network address of the communication network, wherein the main radio unit and its associated standby radio units are configured to be operated in parallel and to exchange operational parameters during operation of said communication system, wherein an operation failure of the main radio unit of a radio station triggers an automatic handover of the used network address from the main radio unit of the radio station to an associated standby radio unit of said radio station to maintain an uninterrupted communication between the user console and the respective radio station of said communication system.

In a possible embodiment of the communication system according to the first aspect of the present invention, the operation failure of the main radio unit of the radio station is detected either by the main radio unit itself and/or by at least one of its associated standby radio units.

In a still further possible embodiment of the communication system according to the first aspect of the present invention, if the main radio unit of the radio station does detect an operation failure of the main radio unit itself, the affected main radio unit sends an instruction to a preconfigured or selected standby radio unit of the radio station to take over communication with the user console using the network address being handed over by the main radio unit to the respective standby radio unit.

In a further possible embodiment of the communication system according to the first aspect of the present invention, the main radio unit of the radio station is adapted to send regular keep-alive messages to the associated standby radio units of said radio station.

In a still further possible embodiment of the communication system according to the first aspect of the present invention, the standby radio units of the radio station are adapted to monitor reception of keep-alive messages from the associated main radio unit of said radio station and are adapted to detect a failure of the main radio unit in case of absence of received keep-alive messages.

The use of keep-alive messages and detection of a failure of a main radio unit provides a very robust detection mechanism.

In a further possible embodiment of the communication system according to the first aspect of the present invention, after handover of the network address from the failed main radio station to the preconfigured or selected standby radio unit, the standby radio unit having received the handed over network address becomes automatically the new main radio unit of said radio station and informs the remaining standby radio units of said radio station about its status as the new main radio unit of said radio station.

This provides the advantage that in case that also the standby radio unit having taken over communication from the initial main radio unit fails, a further switchover to another standby unit can take place, thus improving security of the communication system against failures.

In a still further possible embodiment of the communication system according to the first aspect of the present invention, the radio units of the radio station are adapted to communicate via the communication network with the user console in a communication session using an IP protocol, a Voice over IP protocol or another packet-oriented protocol.

This provides the advantage that the communication system can be based on existing well-established data protocols. Further, existing systems can be expanded or updated to implement a communication system according to the present invention.

In a still further possible embodiment of the communication system according to the first aspect of the present invention, the radio station comprises a ground radio station having a main radio unit and at least one associated standby radio unit operating in parallel to establish parallel radio links with at least one mobile radio unit.

In a still further possible embodiment of the communication system according to the first aspect of the present invention, the radio links between the radio units of the radio station and the at least one mobile radio unit provide communication by means of amplitude modulated radio signals.

In a still further possible embodiment of the communication system according to the first aspect of the present invention, the mobile radio unit is integrated in an aircraft providing communication between a pilot of said aircraft via the main radio unit of the radio station and the communication network with a user console of an air traffic control center.

In a still further possible embodiment of the communication system according to the first aspect of the present invention, each radio station belongs to a corresponding air traffic sector.

In a still further possible embodiment of the communication system according to the first aspect of the present invention, the operation parameters exchanged between the main radio unit of a radio station and its associated standby radio units during operation of said communication system comprise operation radio parameters of radio links, in particular radio channel parameters, and/or session parameters of the communication session with the user console via the communication network.

In a further possible embodiment of the communication system according to the first aspect of the present invention, the handover of the network address from the main radio unit of a radio station to a standby radio unit of said radio station is recorded by a local recorder of said radio station and/or communicated via the communication network to a remote recorder of said communication system.

This allows investigating possible traffic accidents, in particular with respect to circumstances of the traffic incidents caused by possible operation failures of radio units and/or radio stations of the communication system.

In a still further possible embodiment of the communication system according to the first aspect of the present invention, the radio units comprise Voice over IP radio units and/or analog radio units.

In a possible embodiment of the communication system according to the first aspect of the present invention, the analog radio units can be connected via an associated radio gateway to the communication network of the communication system.

In a further possible embodiment of the communication system according to the first aspect of the present invention, in case that the radio station comprises several associated standby radio units for the main radio unit, an operation failure of the main radio unit triggers an automatic handover of its network address either to a preconfigured standby radio unit or to a standby radio unit selected according to a selection criterion.

In a possible embodiment, the handover is performed to a standby radio unit providing currently the highest signal quality via its radio link.

The invention further provides according to a further aspect a method for providing transparent communication between a user console and a radio station via a communication network comprising the features of claim 20.

The invention provides according to the second aspect a method for providing transparent communication between a user console and a radio station via a communication network, wherein the method comprises the steps of: operating a main radio unit and at least one associated standby radio unit of said radio station in parallel and handing over automatically a network address used to address the main radio unit of said radio station to a preconfigured or selected standby radio unit of said radio station if an operation failure or anomaly of the main radio unit has been detected to maintain an uninterrupted transparent communication between said user console and said radio station.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

CONTENT OF THE DRAWINGS

In the following, possible embodiments of the different aspects of the present invention are described in more detail with reference to the enclosed figures.

Figure 1:
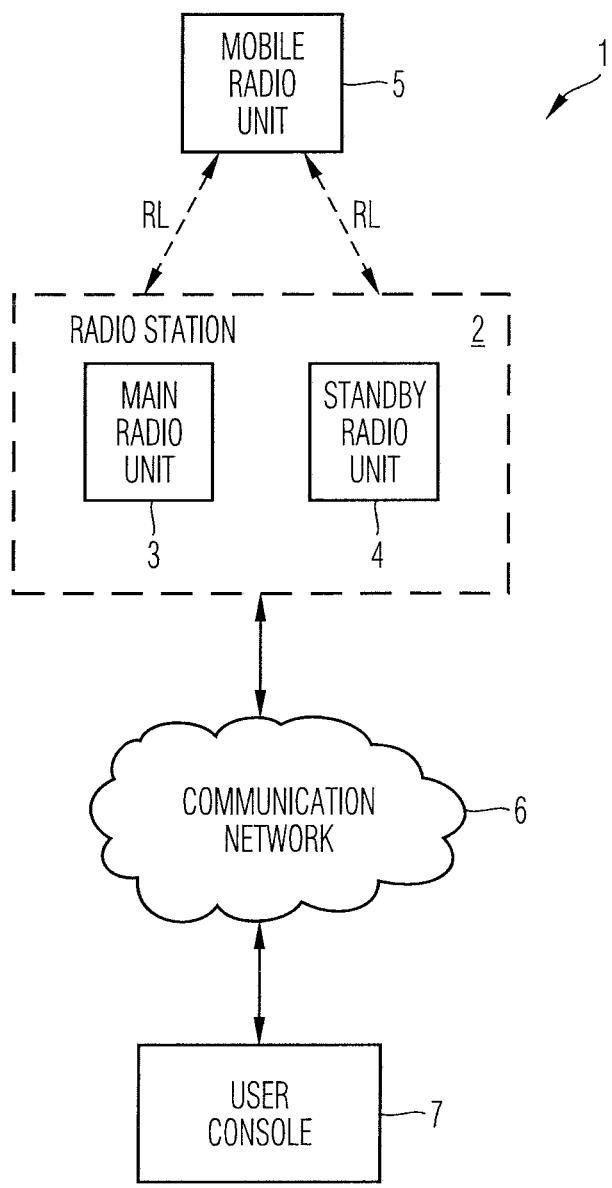
FIG. 1 shows a block diagram for illustrating a possible exemplary embodiment of a communication system according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

Figure 2:
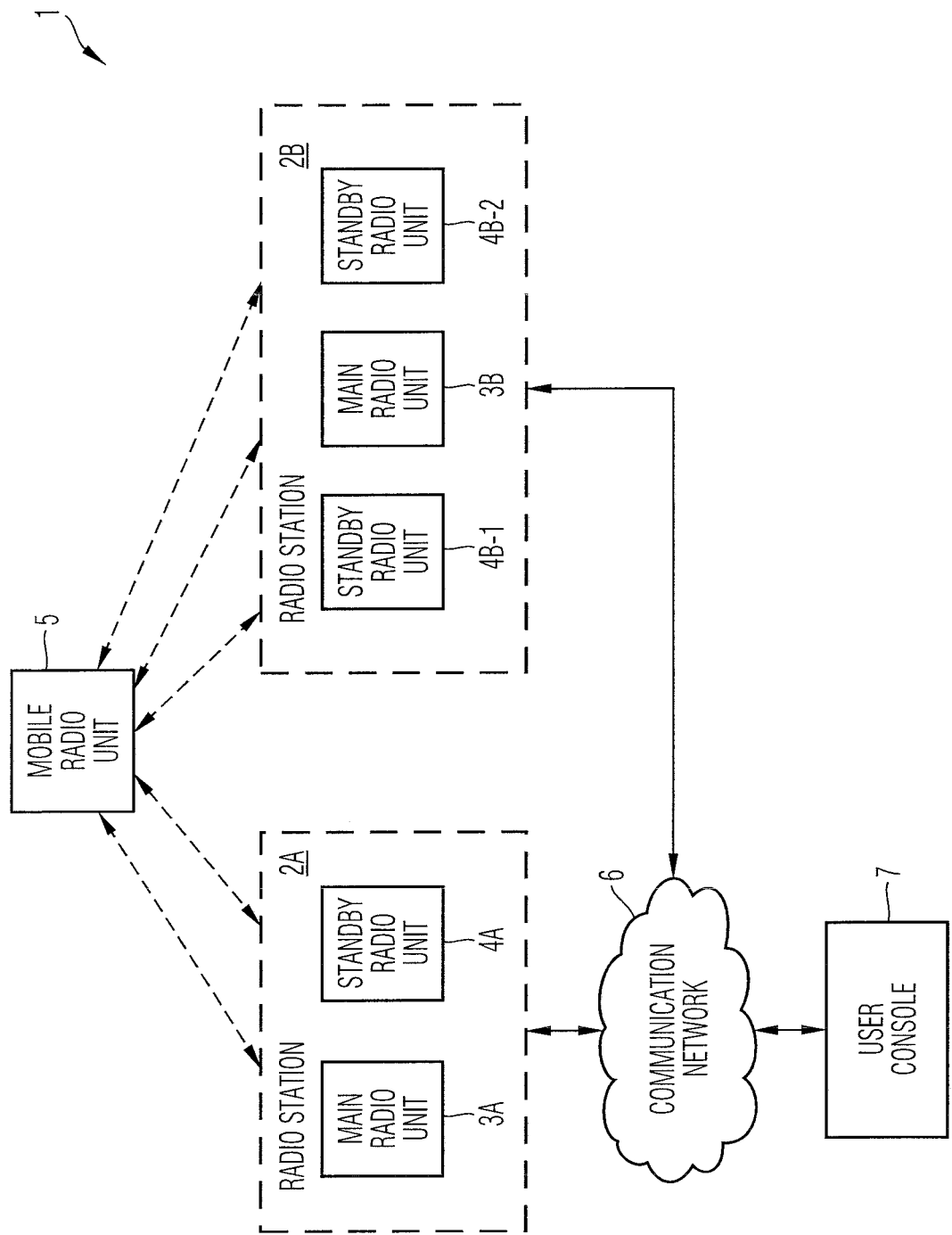
FIG. 2 shows a further block diagram for illustrating a possible further exemplary embodiment of a communication system according to the first aspect of the present invention.

As can be seen in the block diagram of FIG. 1, the communication system 1 according to the first aspect of the present invention comprises at least one radio station 2 which includes a main radio unit 3 and at least one associated standby radio unit 4. In the illustrated embodiment of FIG. 1, the radio station 2 comprises a single main radio unit 3 and a single standby radio unit 4. In other possible embodiments, the radio station 2 may comprise more than one standby radio units 4. The main radio unit 3 and the standby radio unit 4 can both establish a radio link RL with a mobile radio unit 5 as shown in FIG. 1. The mobile radio unit 5 can be integrated or attached to a vehicle such as a car or an aircraft. As shown in FIG. 1, the radio station 2 is connected via a communication network 6 to a user console 7. The user console 7 is connected via the communication network 6 to the main radio unit 3 of the radio station 2 addressed by a network address of the communication network 6. The main radio unit 3 and its associated standby radio units 4 are configured to be operated in parallel and to exchange operational parameters during operation of the communication system 1. An operation failure of the main radio unit 3 of the radio station 2 triggers an automatic handover of the used network address from the main radio unit 3 of the radio station 2 to an associated standby radio unit 4 of the same radio station 2 to maintain an uninterrupted communication between the user console 7 and the respective radio station 2 of the communication system 1. In a possible embodiment, the user console 7 can be provided for an air traffic controller. The mobile radio unit 5 can be integrated in an aircraft for communication between the pilot of the aircraft and the air traffic controller sitting at the user console 7 in an air traffic control center. An operation failure or suspective operation behaviour of the main radio unit 3 can be either detected by the main radio unit itself or by one of its associated standby radio units 4. If the main radio unit 3 does detect an operation failure or operation anomaly of the main radio unit 3 itself, the affected main radio unit 3 can send an instruction to a standby radio unit 4 of the same radio station 2 to take automatically over communication with the user console 7 using the network address being handed over by the main radio unit 3 to the respective standby radio unit 4. If the main radio unit 3 detects itself an operation failure, it can send an instruction in a possible embodiment to a preconfigured other standby radio unit 4 belonging to the same radio station 2. In an alternative embodiment, the main radio unit 3 can send an instruction to take over the communication to a selected standby radio unit 4. Accordingly, the standby radio unit 4 which takes over the communication and receives the handed over network address can be either preconfigured or can be selected. In a possible embodiment, the main radio unit 3 has access to a configuration memory of the radio station 2 to read out which standby radio unit 4 shall take over the communication in case that the main radio unit 3 has an operation failure. In a possible embodiment, the radio station 2 comprises more than one standby radio units 4 as also illustrated in the embodiment of FIG. 2. In a possible embodiment, a selection takes place which standby radio unit 4 of the available standby radio units 4 of the radio station 2 takes over communication in case that the operating main radio unit 3 of the radio station 2 has an operation failure. In a possible embodiment, the selection can be performed automatically depending on the current communication quality of the radio links RL between different standby radio units 4 and the mobile radio unit 5. The operation failure of the main radio unit 3 triggers an automatic handover of its network address to the standby radio unit 4 selected according to a predefined selection criterion, in particular to the standby radio unit 3 providing currently the highest signal quality via its associated radio link RL. Other selection criteria can also be applied, e.g. distance between main radio unit 3 and standby radio unit 4 or technological standard of the standby radio units 4.

In a still further possible embodiment, in case that the radio station 2 has an operation failure, the main radio unit 3 can notify the operating failure via the communication network 6 to the user console 7 of the traffic control center where a selection according to at least one selection criterion can take place. For instance, a selection algorithm can select a standby radio unit 4 which fulfils one or several predefined selection criteria, in particular a standby radio unit 4 providing currently the highest signal quality via its radio link RL to a specific mobile radio unit 5, for instance the mobile radio unit 5 of a specific aircraft in a specific traffic sector. In a possible embodiment, the switching over to the selected standby radio unit 4 can be performed automatically without involving the user at the user console 7. In a further possible embodiment, the selection algorithm executed on a processor of the traffic control center may sort different standby radio units 4 according to predefined selection criteria such as the signal quality of their respective radio links RL and output a rank list of standby radio units via a user interface to the user such as the air traffic controller. In this embodiment, the air traffic controller can select in advance one of the available standby radio units 4 from the displayed list of standby radio units 4 for performing the switchover in case of an operation failure of the main radio unit 3. The displayed list of available standby radio units 4 is sorted according to one or more selection criteria and can provide additional information to the user such as an air traffic controller. For instance, the information can comprise the technology implemented by the standby radio unit 4 or the location (coordinates) of the standby radio unit 4. If a main radio unit 3 of a radio station 2 has an operation failure or provides a radio link RL with only a very poor signal quality, it is important that this operation state is detected as soon as possible by the control center. For this purpose, the main radio unit 3 of the radio station 2 is adapted in a possible embodiment to send regular keep-alive messages to the associated standby radio units 4 of the radio station 2. The standby radio units 4 of the radio station 2 can be adapted to monitor reception of such keep-alive messages from the main radio unit 3 of the radio station 2 to detect a failure of the main radio unit 3 in case of absence of received keep-alive messages. As soon as a failure of the main radio unit 3 has been detected by one or more of the standby radio units 4 because of the missing keep-alive messages, an automatic handover of the used network address of the main radio unit 3 of the radio station 2 to a selected or preconfigured standby radio unit 4 of the same radio station 2 takes place to maintain the uninterrupted communication between the user control 7 and the radio station 2 of the communication system 1. After successful handover of the network address from the failed main radio unit 3 to the preconfigured or selected standby radio unit 4, the standby radio unit 4 having received the handed over network address becomes automatically the new main radio unit 3 of the radio station 2 and can inform the remaining standby radio units 4 of the radio station 2 and the traffic control center about its status as the new main radio unit 3 of the respective radio station 2. The radio units of the radio station 2 are adapted to communicate via the communication network 6 with the user console 7 in a communication session. The communication via the communication network 6 in the communication session can use an IP protocol, a Voice over IP protocol or another packet-oriented data protocol. In a possible embodiment, the main radio unit 3 and the standby radio units 4 of the radio station 2 can further communicate with each other via a local communication bus of the radio station 2.

The radio station 2 illustrated in the embodiment of FIG. 1 can comprise a ground radio station having a main radio unit 2 and at least one associated standby radio unit 4 operating in parallel to establish parallel radio links RL with the mobile radio unit 5 as shown in FIG. 1. In a possible embodiment, the radio links RL between the radio units 3, 4 and the mobile radio unit 5 can provide communication by means of amplitude modulated radio signals. The mobile radio unit 5 can be integrated in a possible embodiment in an aircraft providing communication between a pilot of the aircraft via the main radio unit 3 of the radio station 2 and the communication network 6 with at least one user console 7 used by an air traffic controller. The mobile radio unit 5 can be integrated in any kind of vehicle such as an aircraft, a land vehicle or a ship. The mobile radio unit 5 can in a possible embodiment also be integrated in a wearable device of a user. For instance, a user can carry a mobile radio unit 5 in a traffic or automation system.

In a possible embodiment, the operation parameters exchanged between the main radio unit 3 of a radio station 2 and its associated standby radio units 4 during operation of said communication system 1 can comprise operation radio parameters of radio links RL, in particular radio channel parameters and/or session parameters of the communication session performed between the user console 7 via the communication network 6. In a possible embodiment, the handover of the network address from the main radio unit 3 of the radio station 2 to the predefined or selected standby radio unit 4 of the same radio station 2 can be recorded by a local recorder of the radio station 2 and/or communicated via the communication network 6 to a remote recorder of the communication system 1. The radio units of the radio station 2, i.e. the main radio unit 3 and/or the standby radio unit 4, can comprise Voice over IP radio units and/or analog radio units. An analog radio unit can be connected via an associated radio gateway to the communication network 6 of the communication system 1.

FIG. 2 shows a block diagram of a further possible exemplary embodiment of a communication system 1 according to the first aspect of the present invention. In the illustrated embodiment, the communication system 1 comprises several radio stations 2A, 2B each having a main radio unit 3A, 3B as well as one or more standby radio units 4. In a possible embodiment of the communication system 1, the radio stations 2A, 2B can belong to different air traffic sectors. If the main radio unit 3 of a radio station 2 has an operation failure, this triggers an automatic switchover to an associated standby radio unit 4 of the same radio station 2 to maintain an uninterrupted communication between the user control 7 and the respective radio station 2 of the communication system 1 such that a communication path between the mobile radio unit 5 and the user console 7 is maintained uninterrupted at all times. In the unlikely event that the associated standby radio unit 4 also comprises an operation failure and no further standby radio units 4 are available in the same radio station 2, the switchover of the communication to the main radio unit 3 of the next or closest other radio station 2B can be performed automatically. For instance, in the exemplary embodiment shown in FIG. 2, if the main radio unit 3A of the radio station 2A has an operation failure, an automatic handover of the used network address of the main radio unit 3A to its associated only standby radio unit 4A takes place only if the standby radio unit 4A operates properly. If it is detected that also the standby radio unit 4A does not operate so that the complete radio station 2A is affected by the operation failure, an automatic handover of the used network address from the main radio unit 3A to another currently operating main radio unit such as the main radio unit 3B in the closest other radio station 2B can be performed to maintain uninterrupted communication between the user control 7 and the mobile radio unit 5 via the other radio station 2B of the communication system 1. Which other radio station 2B is chosen can be read from a local configuration memory of the radio station 2A or a central memory or database of the traffic control center. To avoid such a situation, the standby radio unit 4A of the radio station 2A may also send continuously keep-alive messages to the main radio unit 3A to detect preemptively an operation failure of the standby radio unit 4A. The keep-alive messages of the standby radio unit 4A can also be communicated via the communication network 6 to a central controller of the traffic control center. If a standby radio unit 4 indicates an operation failure, it has to be replaced or repaired as soon as possible as long as the main radio unit 3A of the same radio station 2A still operates without failure. The monitoring of operation failures of the radio station 2 can take place locally by a local controller monitoring keep-alive messages exchanged via a local bus between the different radio units of the radio station 2. In an alternative embodiment, the monitoring of keep-alive messages can be performed by a remote controller of the traffic control center connected to the radio station 2 via the communication network 6 such as the Internet. The local monitoring detection of operation failures within a radio station 2 by a local controller has the advantage that the operation failure can be detected even if the communication network 6 breaks down or is overloaded. In this scenario, a detected operation failure may be communicated to the traffic control center by a separate safe communication channel (e.g. via satellite).

Figure 3:
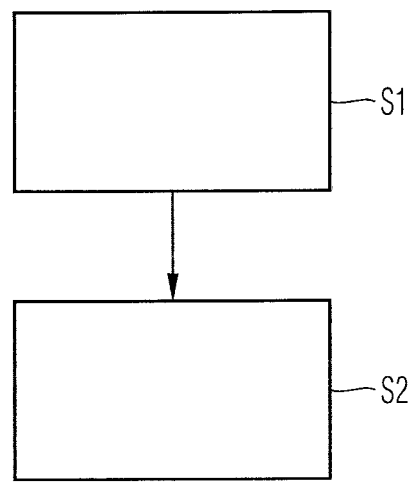
FIG. 3 shows a flowchart for illustrating a possible exemplary embodiment of a method for providing a transparent communication between a user console and a radio station according to a further aspect of the present invention.

FIG. 3 shows a flowchart of a possible exemplary embodiment of a method for providing transparent communication between a user console 7 and a radio station 2 via a communication network 6.

In a first step S1, a main radio unit 3 and at least one associated standby radio unit 4 of the same radio station 2 are operated in parallel.

In a further step S2, a network address used to address the main radio unit 3 of the radio station 2 is handed over automatically to a preconfigured or selected standby radio unit 4 of the same radio station 2 as soon as an operation failure of the main radio unit 3 has been detected. This is performed to maintain an uninterrupted transparent communication between the user console 7 with the respective radio station 2.

Figure 4:
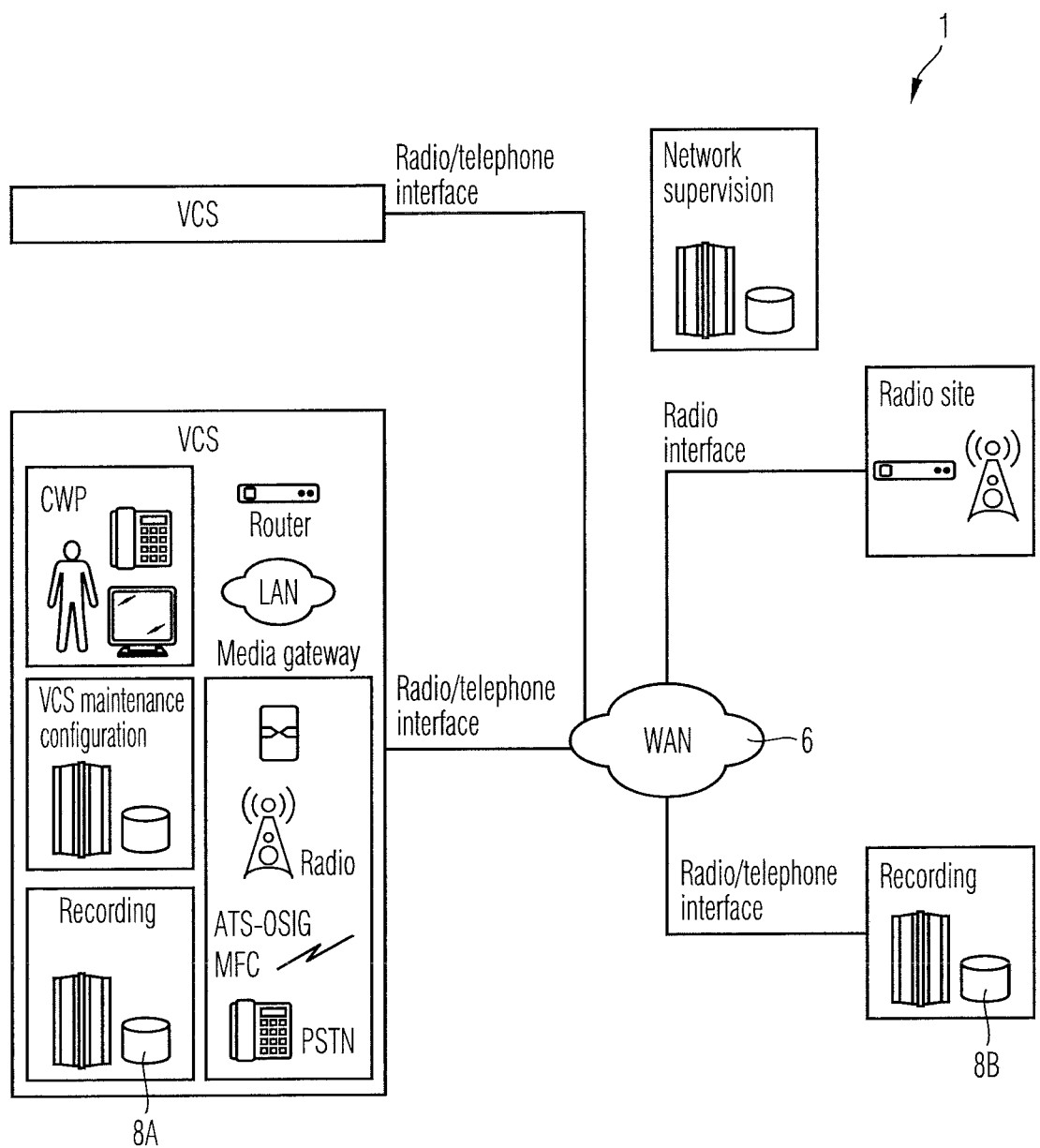
FIG. 4 shows a further block diagram for illustrating a further possible exemplary embodiment of a communication system according to a first aspect of the present invention.

FIG. 4 shows a block diagram of a possible exemplary embodiment of a communication system 1 according to the first aspect of the present invention. In the illustrated exemplary embodiment, the communication network 6 is implemented by a wide area network WAN. The radio site or radio station 2 is connected via a radio interface to the wide area network 6 of the system 1. The voice communication system VCS which can be integrated in the traffic control center can be connected to the wide area network 6 by means of a radio/telephone interface as illustrated in FIG. 4. More than one voice control system VCS can be connected to the communication network 6. In a possible embodiment, the handover of the network address from the main radio unit 3 of the radio station 2 to a standby radio unit 4 of the same radio station 2 can be recorded by a local recorder of the radio station 2 or communicated via the communication network 6 to a remote recorder of the communication system 1. In the illustrated embodiment, a separate remote recorder 8B can be connected via a radio/telephone interface to the wide area network 6 as shown in FIG. 4.

Further, the voice control system VCS integrated in the traffic control center can also comprise a remote recorder 8A as shown in FIG. 4 for recording the network address handover. The recorded network address handover can later be analyzed in case of a traffic problem. The network can comprise routers which can handle the routing of voice packets and data packets on the basis of a network address, in particular an IP address. In an information sink, the digital voice packets can be converted back into an analog signal. Radios can be remote-monitored and remote-controlled via an IP-based data connection. The voice transmission as well as the remote monitoring of the radio stations 2 can be performed via the same IP interface on the radio sites. An advantage of the communication system 1 as illustrated in FIG. 4 is that no sample switching nodes are required. For security reasons, the system is designed redundantly in the voice network. In an IP-based data network, data packets are not distributed by a central control unit but by routers. The information source needs to know the IP address or network address of the communication partner. The network addresses which may be defined in an address plan can dynamically be adjusted to operational conditions. Consequently, the data packets can be switched via several routers distributed in the communication network 6 and are not switched centrally.

The basis for the Voice over IP-based interface VCS/CWP and the radio sites can use a session integration protocol SIP as well as a real-time transport protocol RTP. A call setup between the radio sites and the VCS/CWP can be signaled using the session initiation protocol SIP. After a successful call setup, a bidirectional RTP session can be initiated between the radio station 2 and the VCS/CWP. Besides voice, additional information for a signaling can be transmitted in an RTP header. For example, an RTP header can for instance transmit push-to-talk PTT and squelch (SQ) signals. The extended RTP header can also be used for monitoring (keep-alive) of connections in the communication system 1 such as the connection between the radio station 2 and the VCS system. For instance, if no voice is transmitted, keep-alive signals can be sent in an extended RTP header to monitor their correct reception. The extended RTP header can also be used for keep-alive signals exchanged between the main radio unit 3 and a standby radio unit 4 of a radio station 2.

Figure 5:
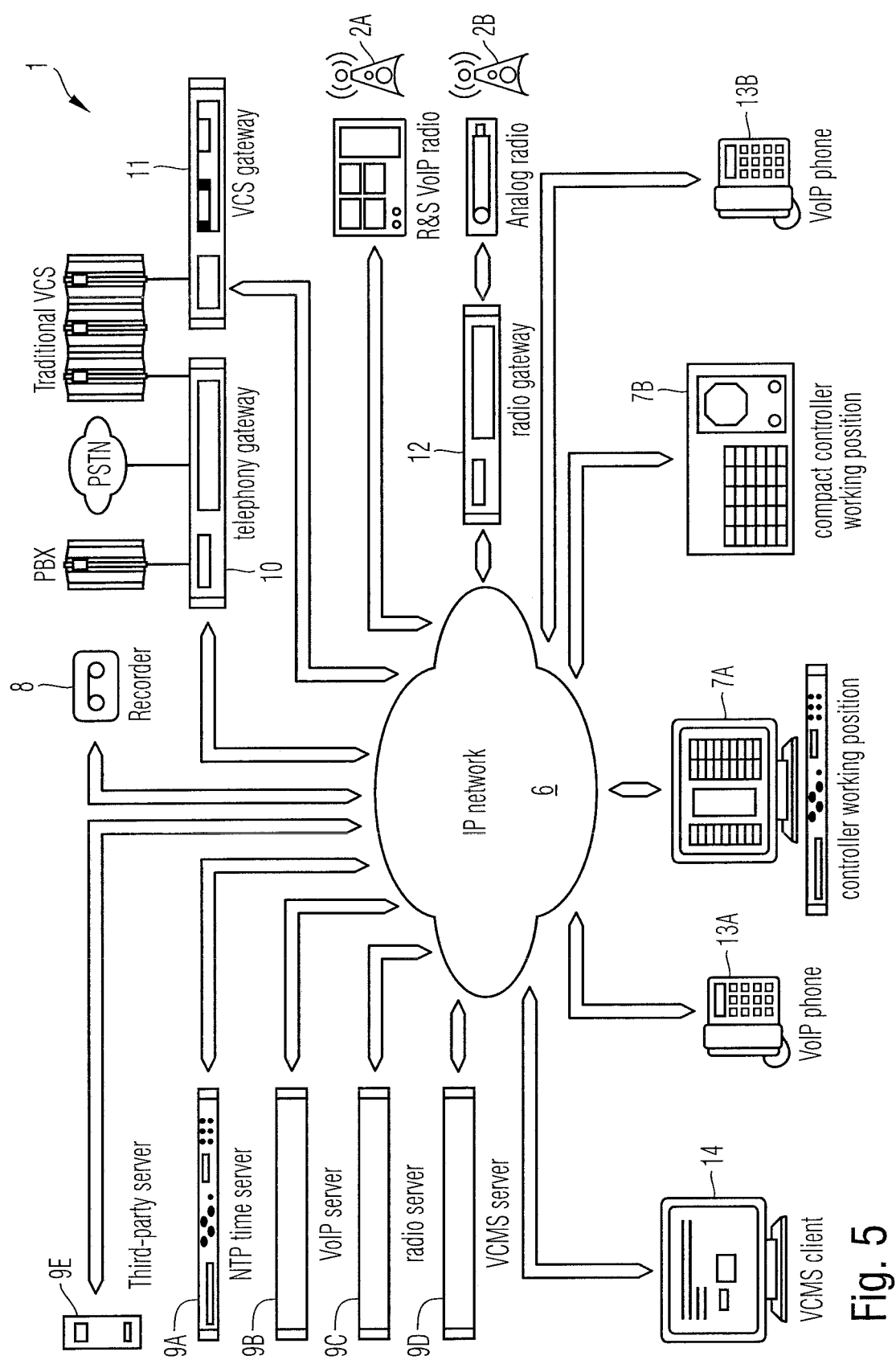
FIG. 5 shows a further schematic diagram for illustrating a possible exemplary embodiment of a communication system according to the present invention.

FIG. 5 shows a diagram for illustrating an exemplary embodiment of an air traffic control system forming a possible embodiment of the communication system 1 according to the present invention. In the illustrated embodiment, the communication network 6 is formed by an IP network to which a plurality of different components can be connected. Different kinds of servers 9 can be connected to the IP network 6 as shown in FIG. 5. The servers 9 can comprise an NTP time server 9A, a Voice over IP server 9B, a radio server 9C as well as an VCNS server 9D. Further, the IP network or communication network 6 allows to connect a third party server 9E to the system 1. Further, the system 1 can comprise a remote recorder 8. A telephone gateway 10 can be provided for connecting a PBX, a PSTN or a traditional VCS system to the communication system 1 according to the present invention. The VCS system can also be connected via a VCS gateway 11 to the IP network 6 as shown in FIG. 5. Different kinds of radio stations 2 can be connected to the IP network 6 as well. The Voice over IP radio station 2A having a main radio unit 3 and one or more standby radio units 4 can be connected directly to the IP network 6 as shown in FIG. 5. In contrast, an analog radio station 2B is connected via a radio gateway 12 to the IP network 6. One or more controller working consoles or user consoles 7 can be connected in the control center to the IP network 6. In the illustrated embodiment, a controller working console 7A and a compact controller working position 7B can be connected to the IP network 6. The associated Voice over IP phones 13A, 13B can be connected to the IP network 6 as well. In the illustrated embodiment of FIG. 5, a VCS client 14 is connected to the IP network 6. The IP-based communication system 1 as shown in FIG. 1 fulfils the requirements of availability, reliability and safety in dynamic scenarios with network-based sharing and distribution of operational resources. The communication system 1 according to the present invention can also provide virtualization of resources, for instance virtual servers using slices of the same physical server.

Figure 6:
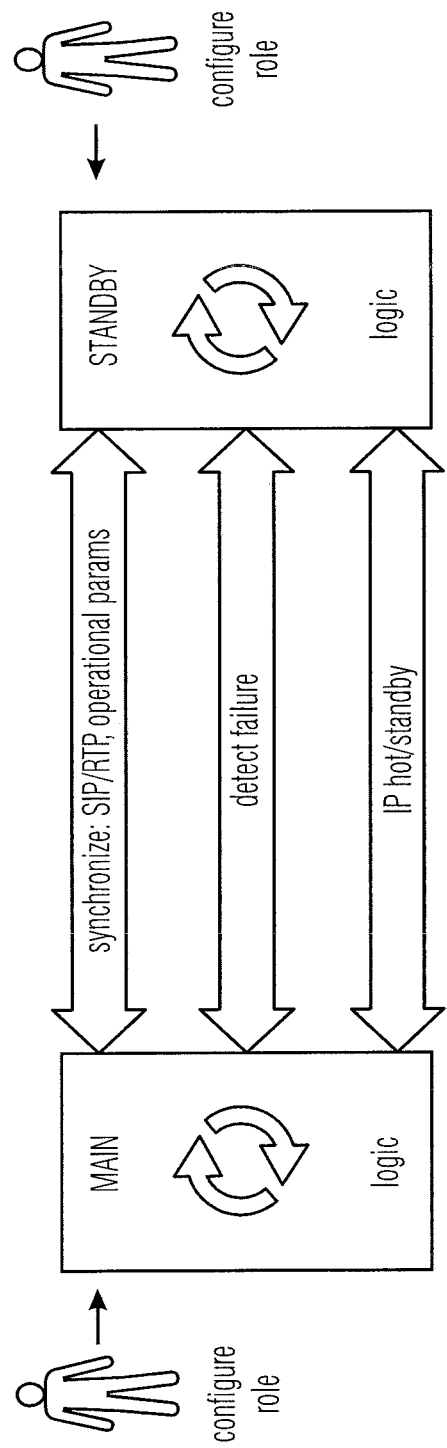
FIG. 6 shows a schematic diagram for illustrating the system and method according to the present invention.

FIG. 6 shows architectural components which can be used in the communication system 1 according to the present invention. The communication system 1 according to the present invention can provide a main standby solution for a M-to-M setup, in particular for a one-to-one (1:1) setup wherein each radio station 2A comprises a single main radio unit 3 and one associated standby radio unit 4. In an possible embodiment, an administrator of the system can configure the radio stations 2 and the radio units of the respective radio stations 2. The administrator can configure the role of each radio unit as forming either a main radio unit 3 or a standby radio unit 4. During a fault-free operation, synchronization between main radio units 3 and standby radio units 4 can be performed to distribute SIP/RTP-related state information as well as operational parameters. These operational parameters can for instance comprise a frequency and/or a channel spacing. This allows for a transparent handover of the network address. Failure detection can be achieved by regular keep-alive messages sent from the main radio unit 3 to the standby radio units 4 of the radio station 2 wherein an absence of keep-alive messages indicates an operation failure of the main radio unit 3. In an alternative embodiment, the main radio unit 3 can ask the standby radio unit 4 explicitly to take over communication. An IP Hot/Standby solution can be implemented which ensures that the standby radio unit 4 is reachable under the same IP address as the main radio unit 3, for instance after a main ground radio station 2 has failed. A control logic can be provided to integrate these functions into an existing radio architecture. Accordingly, the main radio unit 3 can comprise a main logic and a standby radio unit 4 can comprise a standby logic as illustrated in the block diagram of FIG. 6. The main logic of the main radio unit 3 and the standby logic of the standby radio unit 4 can communicate with each other bidirectionally as shown in FIG. 6. The bidirectional communication can comprise a local communication using a local bus or alternatively a communication via the communication network 6 of the communication system 1. The bidirectional communication link between the main radio unit 3 and the standby radio unit 4 can be used for synchronization and for exchanging of operational parameters. Further, the bidirectional communication channel can be used for detecting a failure either in the main radio unit 3 and/or in the standby radio unit 4. Further, the communication channel can be used for an IP Hot/Standby solution. The synchronized data exchanged between this main logic and the standby logic can comprise operational parameters and/or connection session parameters (Voice over IP, SEP, ATP) provided to the user console 7. Further, the exchanged data can comprise failure data or keep-alive messages. The configuration of a radio unit as a main radio unit 3 or as a standby radio unit 4 can be stored in a local memory of the radio station 2 or in a remote database of the communication system 1. The configuration can be performed by an administrator of the communication system 1. The configuration can be performed in a preferred embodiment remotely via the communication network 6.

The communication network 6 according to the present invention allows continuous ground/ground, ground/air voice communication recordings with synchronized flight-related data. The recordings can comprise in a preferred embodiment also recordings of network address changes, in particular the handover of network addresses which can be used in case of traffic problems. In a possible embodiment, the communication system 1 can comprise one or more Voice over IP air traffic recorders for recording, archiving and playback of voice communications synchronized with related network address changes in the system 1. The system 1 can support a real-time streaming protocol RTP to establish, terminate and maintain communication sessions. Recordings can require an established communication session. The real-time streaming protocol RTP can rely on a transport layer protocol such as TCP/UDP wherein these entities use Voice over IP to exchange capabilities and connection information such as IP address, port number and transport protocols. In a possible embodiment, the communication system 1 can also be adapted to provide simulations of different traffic scenarios and/or failure scenarios.

In case that a problem has occurred during traffic control, data recorded in the local or remote recorders 8 can be analyzed by an analyzing tool executed on a processor to find out the cause of the problems based on the synchronized data, in particular operation failures of radio stations 2 and network address handovers triggered by these failures. The system 1 provides for a transparent and permanent safe connection between a user of the mobile radio unit 5 and a user at the user console 7 for exchanging of information, in particular voice information. Interruptions of the communication are avoided so that no misunderstandings between a pilot and an air traffic controller can occur. The communication system 1 provides for a transparent Voice over IP Hot/Standby radio switchover in a robust and secure manner.

Although the present invention has been described in the above by way of preferred embodiments, it is not limited thereto, but rather can be modified in a wide range of ways. In particular, the invention can be changed or modified in various ways without deviating from the core of the invention.

REFERENCE SIGNS

1 communication system
2 radio station
3 main radio unit
4 standby radio unit
5 mobile radio unit
6 communication network
7 user console
8 recorder
9 server
10 telephone gateway
11 VCS gateway
12 radio gateway
13 IP phones
14 VCS client

What we claim is:

1. An air traffic control, ATC, system, the communication system comprising:
   at least one radio station which includes a main radio unit and plurality of associated standby radio units; and
   a user console in an air traffic control center, the air traffic control center connected via a communication network to the main radio unit of the radio station addressed by a network address of the communication network;
   wherein the main radio unit and its associated standby radio units are configured to be operated in parallel and to exchange operational parameters during operation of said communication system;
   wherein a selection algorithm executed on a processor of the air traffic control center sorts different standby radio units according to a signal quality of their respective radio links and outputs a rank list of the sorted standby radio units via a user interface to a user, for the user to select in advance one of the standby radio units from the displayed list of standby radio units;
   wherein the main radio unit of the at least one radio station is adapted to send regular keep-alive messages at a regular time interval to the associated standby radio units of said radio station;
   wherein the standby radio units of the at least one radio station are adapted to monitor reception of keep-alive messages from the associated main radio unit of said radio station and to detect an operation failure of the main radio unit of said radio station in case of absence of keep-alive messages received at the regular time interval and are adapted to responsively trigger an automatic handover of the used network address from the main radio unit of the radio station to the selected associated standby radio unit of said radio station to maintain an uninterrupted communication between the user console and the respective radio station of said ATC system.

2. The ATC system of claim 1 wherein after handover of the network address from the failed main radio unit to the preconfigured or selected standby radio unit, the standby radio unit having received the handed over network address becomes automatically the new main radio unit of said radio station and informs the remaining standby radio units of said radio station about its status as the new main radio unit of said radio station.

3. The ATC system of claim 1 wherein the main radio unit and stand by radio units of the radio station are adapted to communicate via the communication network with the user console in a communication session using an IP protocol, a Voice over IP protocol or another packet-oriented protocol.

4. The ATC system of claim 1 wherein the radio station comprises a ground radio station having a main radio unit and at least one associated standby radio unit operating in parallel to establish parallel radio links (RL) with a mobile radio unit.

5. The ATC system of claim 4 wherein the radio links (RL) between the main radio unit and stand by radio units of the radio station and the mobile radio unit provide communication by means of amplitude modulated radio signals.

6. The ATC system of claim 4 wherein the mobile radio unit is integrated in an aircraft providing communication between a pilot of said aircraft via the main radio unit of the radio station and via the communication network with a user console of an air traffic control center.

7. The ATC system of claim 6 wherein each radio station belongs to a corresponding air traffic sector monitored by the air traffic control center.

8. The ATC system of claim 1 wherein the operation parameters exchanged between the main radio unit of a radio station and its associated standby radio units during operation of said ATC system comprises operation radio parameters of radio links (RL), in particular radio channel parameters, with the user console via the communication network.

9. The ATC system of claim 1 wherein the operation parameters exchanged between the main radio unit of a radio station and its associated standby radio units during operation of said ATC system comprise session parameters of the communication session with the user console via the communication network.

10. The ATC system of claim 1 wherein the handover of the network address from the main radio unit of a radio station to a standby radio unit of said radio station is recorded by a local recorder of said radio station.

11. The ATC system of claim 1 wherein the handover of the network address from the main radio unit of a radio station to a standby radio unit of said radio station is communicated via the communication network to a remote recorder of said ATC system.

12. The ATC system of claim 1 wherein the radio units comprise Voice over IP radio units or analog radio units connected via an associated radio gateway to the communication network of said ATC system.

13. A method for providing transparent communication in an air traffic control, ATC, system between a user console in an air traffic control center and a radio station via a communication network, the method comprising:
operating a main radio unit and a plurality of associated standby radio units of said radio station in parallel;
sorting, by a selection algorithm executed on a processor of the air traffic control center, different standby radio units according to a signal quality of their respective radio links;
outputting, by the processor, a rank list of the sorted standby radio units via a user interface to a user, for the user to select in advance one of the standby radio units from the displayed list of standby radio units;
sending, by the main radio unit of the radio station, keep-alive messages at a regular time interval to the associated standby radio units of said radio station;
monitoring, by the standby radio units of the radio station, reception of keep-alive messages from the associated main radio unit of said radio station and detecting an operation failure of the main radio unit of said radio station in case of absence of keep-alive messages received at the regular time interval; and
responsively handing over automatically a network address used to address the main radio unit of said radio station to the selected standby radio unit of said radio station if the operation failure of the main radio unit has been detected to maintain an uninterrupted transparent communication between said user console and said radio station.

* * * * *